(12) United States Patent
Umakoshi et al.

(10) Patent No.: US 12,401,645 B2
(45) Date of Patent: Aug. 26, 2025

(54) PROCESSING DEVICE, PROCESSING METHOD, AND PROGRAM

(71) Applicant: Nippon Telegraph and Telephone Corporation, Tokyo (JP)

(72) Inventors: Kenji Umakoshi, Musashino (JP); Keiichiro Kashiwagi, Musashino (JP); Yui Saito, Musashino (JP); Koki Mitani, Musashino (JP); Tomohiro Inoue, Musashino (JP); Tomoyuki Fujino, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 320 days.

(21) Appl. No.: 18/023,570

(22) PCT Filed: Aug. 28, 2020

(86) PCT No.: PCT/JP2020/032697
§ 371 (c)(1),
(2) Date: Feb. 27, 2023

(87) PCT Pub. No.: WO2022/044281
PCT Pub. Date: Mar. 3, 2022

(65) Prior Publication Data
US 2023/0353571 A1 Nov. 2, 2023

(51) Int. Cl.
*H04L 9/40* (2022.01)
(52) U.S. Cl.
CPC .......... *H04L 63/10* (2013.01); *H04L 63/0428* (2013.01); *H04L 63/20* (2013.01)
(58) Field of Classification Search
CPC ..... H04L 63/10; H04L 63/0428; H04L 63/20; H04L 63/0227
See application file for complete search history.

(56) References Cited

U.S. PATENT DOCUMENTS

2004/0255136 A1* 12/2004 Fadyushin .......... G06F 21/6209
713/193
2011/0238837 A1 9/2011 Song et al.
(Continued)

FOREIGN PATENT DOCUMENTS

JP 2005512170 4/2005
JP 2015512170 4/2005
(Continued)

OTHER PUBLICATIONS

Costan et al., "Intel SGX Explained," css.csail.mit, retrieved on Aug. 18, 2020, retrieved from URL <http://css.csail.mit.edu/6.858/2020/readings/costan-sgx.pdf>, 118 pages.
(Continued)

*Primary Examiner* — Frantz B Jean
(74) *Attorney, Agent, or Firm* — Fish & Richardson P.C.

(57) ABSTRACT

A processing device includes: an acquiring unit which acquires first processing data from a first user terminal and acquires second processing data from a second user terminal; a matching unit which receives a request for sharing result data of processing by the first processing data and the second processing data from the first user terminal and receives permission of use of the second processing data by the first user terminal from the second user terminal; a processing unit which, when receiving permission from the second user terminal, processes the first processing data and the second processing data and outputs result data; and a providing unit which provides the result data to the first user terminal.

11 Claims, 6 Drawing Sheets

(56) References Cited

U.S. PATENT DOCUMENTS

| | | | |
|---|---|---|---|
| 2017/0171248 | A1 | 6/2017 | Li et al. |
| 2019/0036830 | A1 | 1/2019 | Yamato |
| 2019/0114503 | A1 | 4/2019 | Nishida et al. |
| 2019/0114530 | A1 | 4/2019 | Nishida et al. |
| 2020/0228313 | A1 | 7/2020 | Storm et al. |

FOREIGN PATENT DOCUMENTS

| | | | | |
|---|---|---|---|---|
| JP | 2017167748 | | 9/2017 | |
| JP | 2017167748 A | * | 9/2017 | ............. G06F 16/00 |
| JP | 2019168590 | | 10/2019 | |
| JP | 2019168590 A | * | 10/2019 | |
| JP | 2019215512 | | 12/2019 | |
| JP | 2019215512 A | * | 12/2019 | ............... G06N 3/04 |

OTHER PUBLICATIONS

Kikuchi et al., "Progress of Secure Computation: Basic Constructions and Dedicated Algorithms," IEICE ESS Fundamentals Review, Jul. 1, 2018, 12(1):12-20 (English Abstract).

Ministry of Internal Affairs and Communications [online], "Section 2 Problems in Distribution and Utilization of Data," soumu.go.jp, 2017, retrieved on Aug. 18, 2020, retrieved from URL <https://www.soumu.go.jp/johotsusintokei/whitepaper/ja/h29/pdf/n2200000.pdf>, pp. 63-88 (No Translation).

* cited by examiner

[Fig. 1]
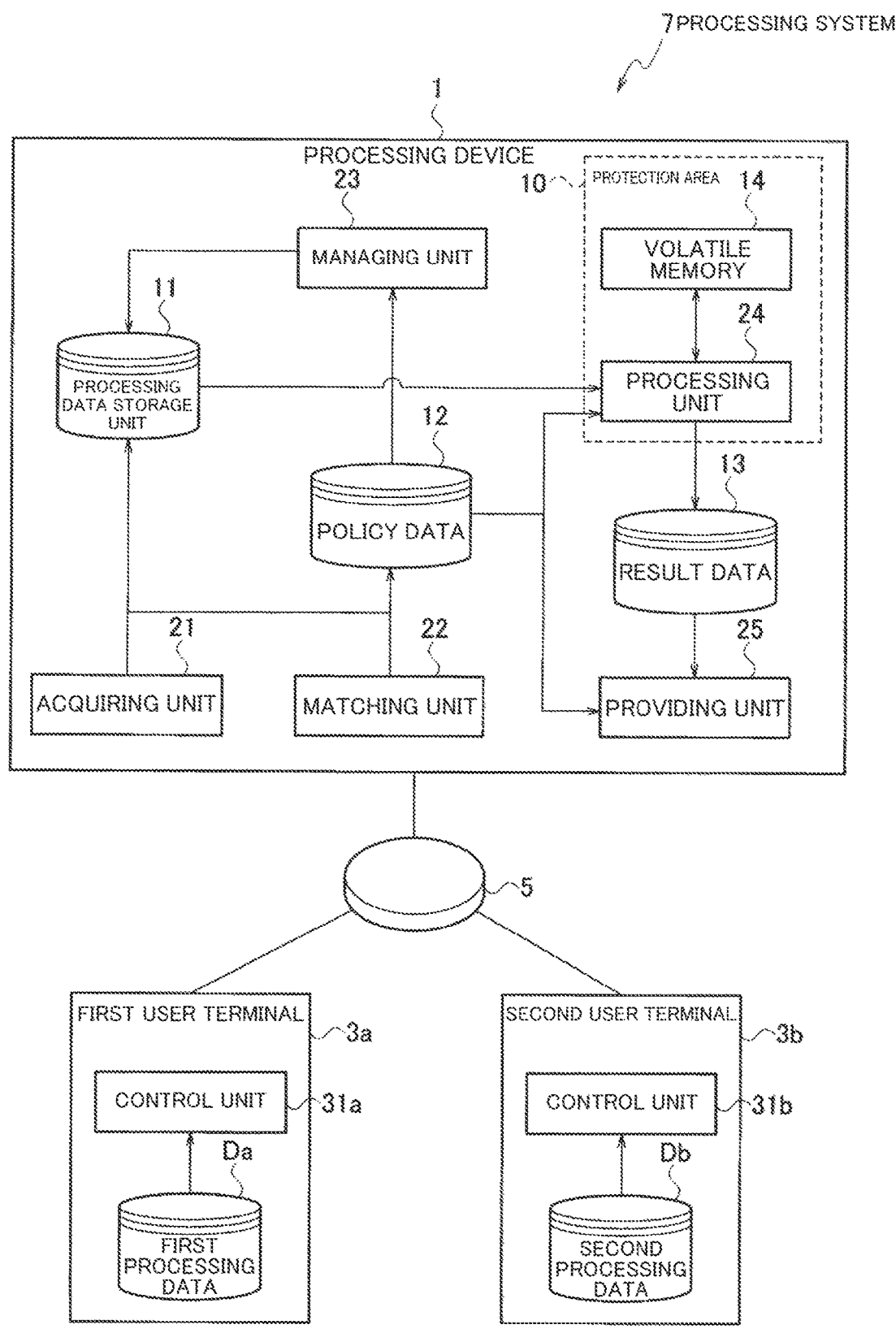

[Fig. 2]
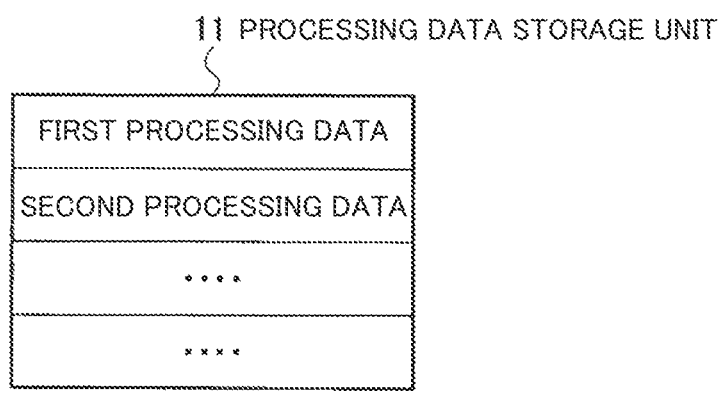

12a POLICY DATA
(AGREEMENT POLICY DATA)

| IDENTIFIER OF POLICY | .... | .... |
|---|---|---|
| IDENTIFIER OF REQUESTING USER | .... | .... |
| IDENTIFIER OF PERMITTING USER | .... | .... |
| IDENTIFIER OF USING USER | .... | .... |
| IDENTIFIER OF PROCESSING DATA | .... | .... |
| USE PERIOD | .... | .... |

(b)

12b POLICY DATA
(PUBLIC POLICY DATA)

| IDENTIFIER OF DISCLOSURE POLICY | .... | .... |
|---|---|---|
| IDENTIFIER OF DISCLOSING USER | .... | .... |
| IDENTIFIER OF DISCLOSURE DESTINATION USER | .... | .... |
| IDENTIFIER OF PROCESSING DATA | .... | .... |
| DISCLOSURE PERIOD | .... | .... |

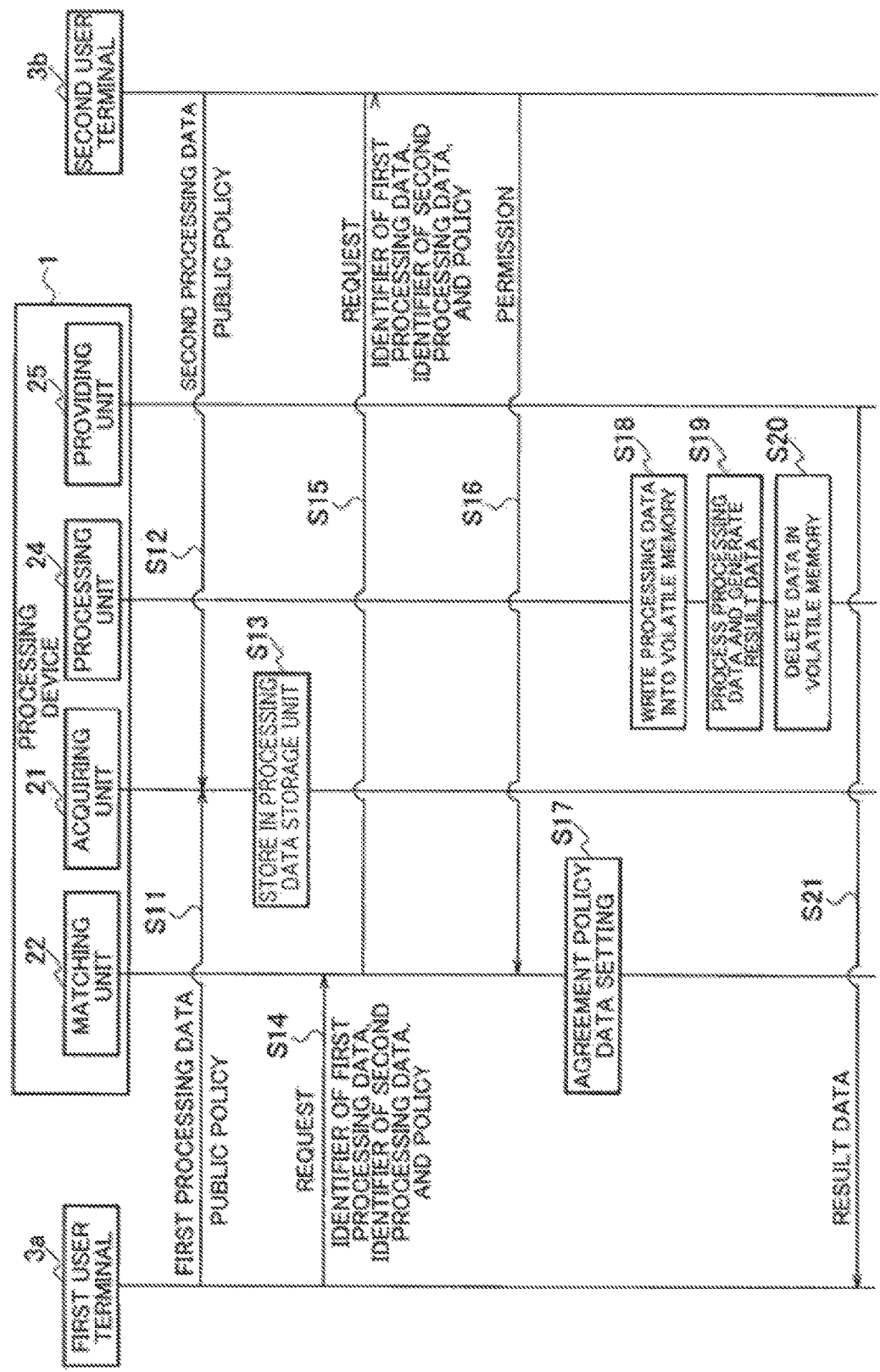
[Fig. 4]

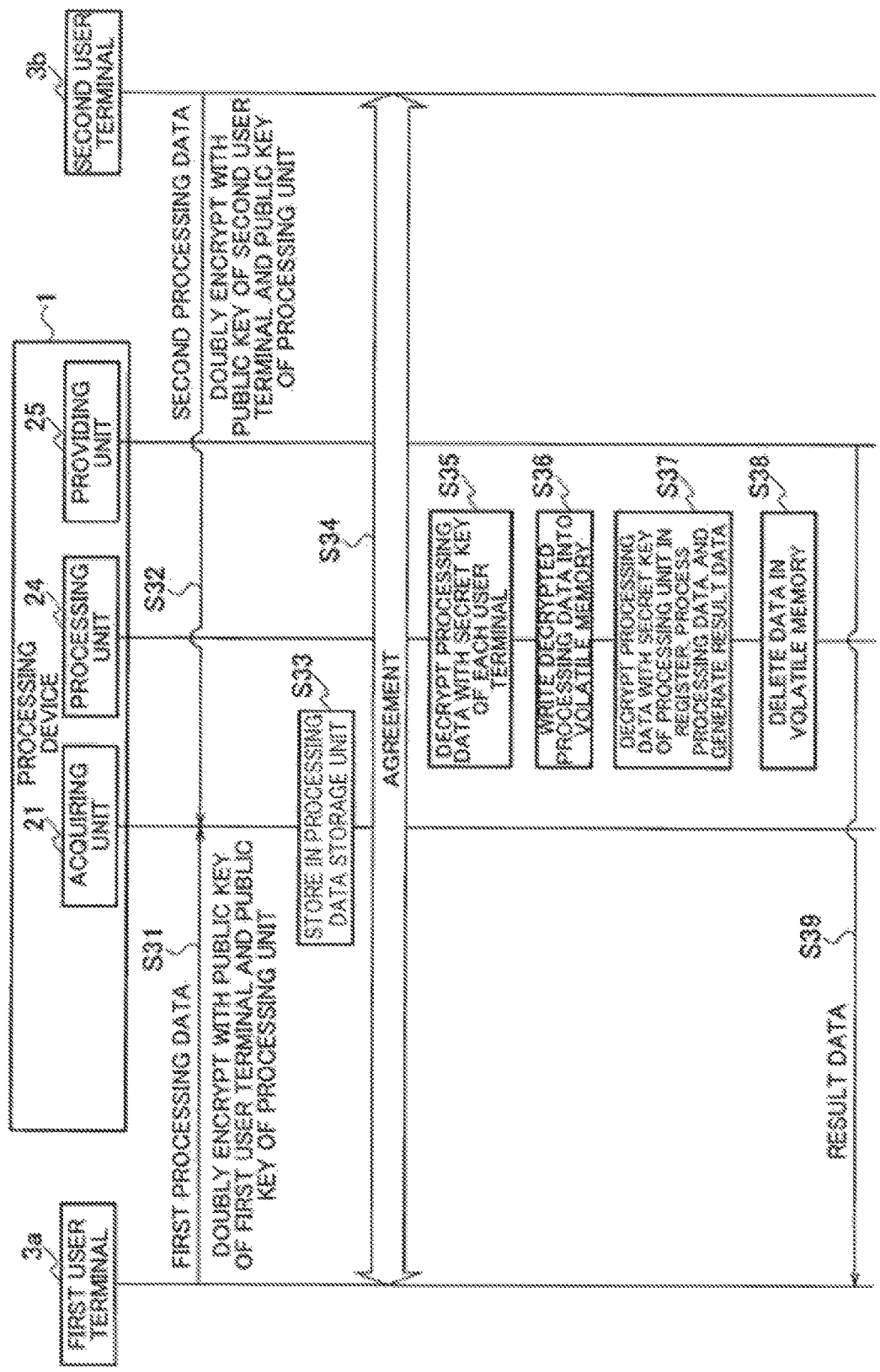

[Fig. 6]
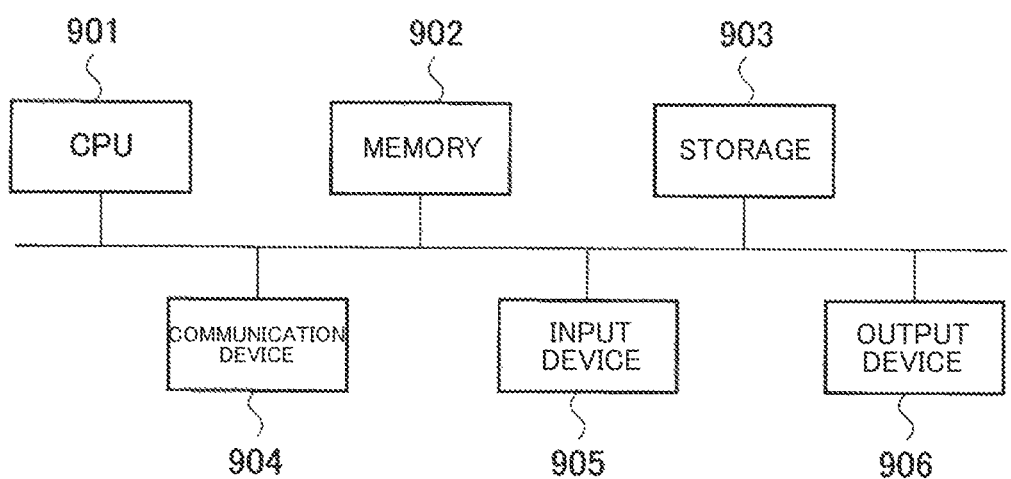

PROCESSING DEVICE, PROCESSING METHOD, AND PROGRAM

CROSS-REFERENCE TO RELATED APPLICATIONS

This application is a National Stage application under 35 U.S.C. § 371 of International Application No. PCT/JP2020/032697, having an International Filing Date of Aug. 28, 2020.

The disclosure of the prior application is considered part of the disclosure of this application, and is incorporated by reference in its entirety into this application.

TECHNICAL FIELD

The present invention relates to a processing device, a processing method, and a program.

BACKGROUND ART

In recent years, the use of data analysis using AI (Artificial Intelligence) or algorithms has been advanced in various industries. Due to the spread of IoT (Internet of Things), each company has more opportunities to analyze data collected from various equipment, sensors, or the like by using a proprietary algorithm, a proprietary learning model, or the like. In addition to data utilization in-house, there is a growing trend toward sharing data between companies and promoting data utilization (refer to NPL 1).

Each company has data desirably managed without being disclosed to other companies as proprietary know-how. There is a method of using secure computation as a method of analyzing data using a data analysis platform implementing a non-proprietary algorithm without disclosing data to other companies (refer to NPL 2). Secure computation is a method of calculating an arbitrary function while leaving data encrypted. Secure computation enables data that cannot be disclosed due to privacy issues and corporate confidentiality to be safely analyzed while keeping the data secret to an algorithm provider.

In order to improve safety against data leakage due to an attack from the outside, there is a memory and a CPU that have the function of encrypting data on the memory but only releasing the encryption inside the CPU (NPL 3).

CITATION LIST

Non Patent Literature

NPL 1: Ministry of Internal Affairs and Communications, "Section 2 Problems in Distribution and Utilization of Data", [online], 2017, [retrieved Aug. 18, 2020], Internet <URL: https://www.soumu.go.jp/johotsusintokei/whitepaper/ja/h29/pdf/n2200000.pdf>

NPL 2: Ryo Ike, Dai Ikarashi, "Progress of Secure Computation: Basic Constructions and Dedicated Algorithms", [online], Jul. 1, 2018, IEICE ESS Fundamentals Review, Volume 12 Issue 1, [retrieved Aug. 18, 2020], Internet CURL: https://www.jstage.jst.go.jp/article/essfr/12/1/12_12/_pdf/-char/en>

NPL 3: Victor Costan and Srinivias Devadas, "Intel SGX Explained", [online], [retrieved Aug. 18, 2020], Internet <URL: http://css.csail.mit.edu/6.858/2020/readings/costan-sgx.pdf>

SUMMARY OF INVENTION

Technical Problem

NPL 1 is limited to disclosing a trend of sharing and utilizing data among companies. NPL 1 neither discloses nor suggests a technique that enables to be shared between companies while concealing data or algorithms from one another as proprietary know-how.

The secure computation disclosed in NPL 2 cannot be applied to data in which an algorithm including data-dependent branches or the like remains encrypted and, in some cases, some processing must be rewritten to processing for secure computation. In other words, it is difficult to apply an algorithm created without assuming secure computation to data that remains encrypted, and a part of processing must be rewritten for secure computation.

In addition, when using a secure computation technique, even if the data to be analyzed remains encrypted and can be kept confidential, the algorithm and the processing program to be used to perform analysis cannot be kept secret from a person performing the analysis.

The present invention has been made in view of the above-mentioned circumstances and an object of the present invention is to provide a technique that enables data to be referred to in computer processing or program data for executing computer processing to be used by others while keeping the data confidential.

Solution to Problem

A processing device according to an aspect of the present invention includes: an acquiring unit which acquires first processing data from a first user terminal and acquires second processing data from a second user terminal; a matching unit which receives a request for sharing result data of processing by the first processing data and the second processing data from the first user terminal and receives permission of use of the second processing data by the first user terminal from the second user terminal; a processing unit which, when receiving permission from the second user terminal, processes the first processing data and the second processing data and outputs the result data; and a providing unit which provides the result data to the first user terminal.

A processing method according to an aspect of the present invention includes steps in which a computer: acquires first processing data from a first user terminal and acquires second processing data from a second user terminal; receives a request for sharing result data of processing by the first processing data and the second processing data from the first user terminal and receives permission of use of the second processing data by the first user terminal from the second user terminal; processes, when receiving permission from the second user terminal, the first processing data and the second processing data and outputs the result data; and provides the result data to the first user terminal.

A processing program according to an aspect of the present invention causes a computer to function as the above processing device.

Advantageous Effects of Invention

According to the present invention, a technique can be provided which enables data to be referred to in computer processing or program data and the like for executing computer processing to be used by others while keeping the data confidential.

BRIEF DESCRIPTION OF DRAWINGS

FIG. 1 is a diagram illustrating a system configuration of a processing system and functional blocks of a processing device and a user terminal according to an embodiment of the present invention.

FIG. 2 is a diagram illustrating an example of a data structure of a processing data storage unit.

FIG. 3 is a diagram illustrating an example of a data structure of policy data.

FIG. 4 is a sequence diagram illustrating processing in a processing system.

FIG. 5 is a sequence diagram illustrating processing using encrypted processing data.

FIG. 6 is a diagram illustrating a hardware configuration of a computer used as a processing device and a user terminal.

DESCRIPTION OF EMBODIMENTS

Hereinafter, embodiments of the present invention will be described with reference to the drawings. Same parts in the drawings will be designated by same reference characters and descriptions thereof will be omitted.

(Processing System)

A processing system 7 using a processing device 1 according to an embodiment of the present invention will be described with reference to FIG. 1. The processing system 7 includes the processing device 1 and a plurality of user terminals 3. The processing device 1 is connected to each of a first user terminal 3a and a second user terminal 3b through a communication network 5 so as to be mutually communicable. While a case where the plurality of user terminals 3 include two user terminals 3 being the first user terminal 3a and the second user terminal 3b will be explained in the example shown in FIG. 1, providing two or more user terminals 3 will suffice and the number of user terminals is not an issue.

The processing system 7 supports sharing of processing data provided by each user terminal 3 with other users and utilization of the processing data by the other users according to a policy of each user. The processing data is data to be referred to in computer processing or program data for executing computer processing. The processing system 7 provides other users with data resulting from processing using the processing data without providing the processing data itself to the users.

For example, when a first user who provides program data requests a second user who provides reference data to share a result of processing of the reference data by a program, the processing system 7 supports an agreement to share the processing result between the users. When the users agree to process the reference data and share the result, the processing device 1 processes the reference data with the program data and provides the processing result to the first user. The same applies to a case where the user who provides the reference data requests the user who provides the program data to share the program data. The processing result is provided to the user having received permission to share the processing result based on the agreement.

Conventionally, a user does not want to disclose his or her own data to other companies, but has a need to obtain a result of processing his or her own data using a program made by another user. On the other hand, a user having a program does not want to disclose the program to other users but wishes to provide a service using a proprietary program.

Therefore, the processing device 1 is operated by a third person who is neutral with respect to each user. The processing device 1 is implemented on, for example, a cloud. The processing device 1 safely manages processing data owned by each user, processes the processing data according to an agreement with each user, and returns a processing result to the user. The processing device 1 can urge the use of the processing data owned by each user without disclosing the processing data to other users.

(User Terminal)

Each of the user terminals 3 is a terminal of a user who uses a service provided by the processing device 1. The user may be an individual, a company, a group, or the like. The user terminal 3 provides processing data to be managed by the processing system 7. When the user is a company, the user terminal 3 may be a terminal used by one or more persons in charge belonging to the company.

As shown in FIG. 1, the first user terminal 3a has first processing data Da and a control unit 31a. The first processing data Da is data provided to the processing device 1 for use by another user such as a user of a second user terminal 3b. The first processing data Da may be stored in a storage service used by each user, for example.

The control unit 31a transmits the first processing data Da to the processing device 1. In addition, the control unit 31a requests the processing device 1 to use processing data provided by other user terminals such as second processing data Db provided by a second user terminal 3b and acquires result data 13. The control unit 31a may be arranged at a base of each user or on a cloud where the processing device 1 is arranged. In this case, the control unit 31a on the cloud is accessed from a terminal arranged at the base of each user through an API (Application Programming Interface) or the like.

Also, the control unit 31a provides an interface for building an agreement on a policy with other users when using the processing data. When requesting the use of the processing data provided by another user, the control unit 31a displays an interface for transmitting a policy for using the processing data and transmits the data of the input policy to the processing device 1. In addition, when the use of processing data provided by the user of the control unit 31a is requested from another user, the control unit 31a displays an interface for responding as to whether or not to permit the policy received from another user and transmits input response data to the processing device 1. The control unit 31a may repeat the display of the interface and the transmission of data a plurality of times until an agreement on the policy can be made with another user.

The second user terminal 3b has second processing data Db and a control unit 31b. The second processing data Db and the control unit 31b are similar to the first processing data Da and the control unit 31a, respectively.

In an embodiment of the present invention, a case will be described in which the first user terminal 3a provides data referred to in computer processing as first processing data Da and the second user terminal 3b provides program data for executing computer processing as second processing data Db. The first user terminal 3a requests the second user terminal 3b to share a result obtained by processing the first processing data Da with the second processing data Db, the processing device 1 processes reference data provided by the first user terminal 3a with the program data provided by the second user terminal 3b, and the processing device 1 provides a result data thereof to the first user terminal 3a. In another example, a user who provides program data requests a user who provides reference data to share a result of processing the reference data with the program data, and receives the processing result. In addition, data of the result may be provided to a user designated by the requesting user.

Further, in the embodiment of the present invention, while a case where one of the first processing data Da and the second processing data Db is data referred to in computer processing and the other is program data for executing computer processing will be described, this case is not restrictive. For example, when both the first processing data Da and the second processing data Db are data to be referred to by computer processing, the first processing data Da and the second processing data Db are processed by a program owned by the processing device 1 or a publicly disclosed program. When both the first processing data Da and the second processing data Db are program data for executing computer processing, the first processing data Da and the second processing data Db process data owned by the processing device 1 or data to be publicly disclosed.

(Processing Device)

The processing device 1 manages processing data provided by the user terminal 3 according to a policy determined by the user. The processing device 1 supports an agreement on a policy between users when sharing the result data. The processing device 1 processes the designated processing data according to the request of the user terminal 3 and returns the result to the user terminal 3.

The processing device 1 is arranged at one base, but may be arranged at a plurality of bases. In addition, in consideration of scale-out, the processing device 1 may be composed of a plurality of devices.

As shown in FIG. 1, the processing device 1 includes a processing data storage unit 11, policy data 12, result data 13, a volatile memory 14, an acquiring unit 21, a matching unit 22, a managing unit 23, a processing unit 24, and a providing unit 25. The processing data storage unit 11 is mounted in a memory 902 or a storage 903. The policy data 12 and the result data 13 are data stored in the memory 902 or the storage 903. The volatile memory 14 is a volatile storage area such as a RAM (Random Access Memory) and is accessed only from the processing unit 24 as will be described later. The acquiring unit 21, the matching unit 22, the managing unit 23, the processing unit 25, and the providing unit 25 are function units implemented on the processing device 1 by execution of a CPU 901.

The processing data storage unit 11 is a storage area for storing data sets of a plurality of pieces of processing data acquired from the user terminal 3. For example, as shown in FIG. 2, the processing data storage unit 11 stores a plurality of pieces of processing data. In an embodiment of the present invention, the processing data storage unit 11 stores the first processing data Da provided by the first user terminal 3a and the second processing data Db provided by the second user terminal 3b. The processing data storage unit 11 need to only include at least data to be processed by the processing device 1 that is data provided from each user terminal. The processing data may be stored in a storage managed by each user before processing by the processing device 1 and may be stored in the processing data storage unit 11 when processing is determined.

In addition, the processing data storage unit 11 may be divided into data areas for each user having provided processing data, and each user terminal 3 may be capable of accessing the data area allocated to the user of the user terminal 3. The user terminal 3 may access the data area of the user in the processing data storage unit 11 when the user uses the processing data in addition to allowing other users to use the processing data.

The policy data 12 is data regarding a policy provided from each user terminal 3. The policy data 12 includes various policy data such as agreement policy data 12a and disclosure policy data 12b. The policy data 12 may be expressed in an arbitrary format such as JSON (JavaScript Object Notation (Java is a registered trademark)).

The agreement policy data 12a will be described with reference to FIG. 3(a). The agreement policy data 12a is data of a policy of a use condition that is agreed upon between a requesting user and a requested user when the requesting user makes a request to the requested user to share a processing result of processing data provided by the requested user. The processing device 1 manages data provided by each of the requesting user and the permitting user according to the agreement policy data 12a.

The agreement policy data 12a includes a policy identifier, an identifier of a requesting user, an identifier of a permitting user, an identifier of a using user, an identifier of processing data, and a use period. The identifier of the requesting user is the identifier of the user having requested use of the processing data provided by another user. The identifier of the permitting user is the identifier of the user who provides the processing data of which use has been requested by another user and is the identifier of the user who either permits or rejects the use by another user in response to the request. The identifier of the using user is the identifier of the user to which the result data is provided and may be the same as or may differ from the identifier of the requesting user. The identifier of the processing data is the identifier of the processing data being an object of the request by the requesting user. The use period is a period during which the requesting user uses the processing data being an object of the request.

The agreement policy data 12a may include items other than those included in FIG. 3(a). The agreement policy data 12a may include an item of a situation in which the processing device 1 indicates an agreement situation of a policy between the requesting user and the permitting user. The agreement situation indicates, for example, whether a policy that both users agree upon is being adjusted or has already been adjusted. In addition, the agreement policy data 12a may include an item of an identifier of each person in charge of the requesting user and the permitting user.

The disclosure policy data 12b will be described with reference to FIG. 3(b). The disclosure policy data 12b is data of a policy which is set by a user who provides the processing data and which becomes a disclosure condition of the processing data. The processing device 1 discloses the processing data provided by each user to the other users according to the disclosure policy data 12b.

The disclosure policy data 12b includes an identifier of a disclosure policy, an identifier of a disclosing user, an identifier of a disclosure destination user, an identifier of processing data, and a disclosure period. The identifier of the disclosing user is the identifier of the user who provides processing data to be disclosed. The identifier of the disclosure destination user is the identifier of a user to which the disclosing user discloses the processing data to be disclosed. In place of the identifier of the disclosing user, an attribute or a condition of the disclosing user may be set. The identifier of the processing data is the identifier of the processing data to be disclosed. The disclosure period is a period during which the disclosing user discloses the processing data to the disclosure destination user.

The disclosure policy data 12b may include items other than those included in FIG. 3(b). The disclosure policy data 12b may include items such as an application when the processing device 1 uses a processing condition to be disclosed by a disclosure destination user.

The result data 13 is data of a result of processing using the processing data stored in the processing data storage unit 11. The result data 13 is provided to the user terminal 3 having requested use of the processing data.

The acquiring unit 21 acquires the first processing data Da from the first user terminal 3a and acquires the second processing data Db from the second user terminal 3b. The acquiring unit 21 stores the first processing data Da and the second processing data Db in the processing data storage unit 11.

The matching unit 22 supports agreement between the first user and the second user with respect to a request for sharing result data of processing of the second processing data Db from the first user terminal 3a. The matching unit 22 receives a request for the result data of processing by the first processing data Da and the second processing data Db from the first user terminal 3a. In this case, since the first processing data Da is data provided from the first user terminal 3a, the matching unit 22 receives the permission for the second processing data Db by the first user terminal 3a from the second user terminal 3b.

The matching unit 22 may receive both a request and a policy from the first user terminal 3a. For example, when the first user terminal 3a refers to the disclosure policy set with respect to the second processing data Db by the second user terminal 3b and the first user terminal 3a desires to make a change, the first user terminal 3a transmits the policy including changed contents thereof to the processing device 1. Alternatively, even when the second user terminal 3b does not set the disclosure policy, the first user terminal 3a transmits a policy for using the second processing data Db to the processing device 1. When receiving a request and a policy from the first user terminal 3a, the matching unit 22 notifies the second user terminal 3b of the policy, and specifies the policy having been permitted by the first user terminal 3a and the second user terminal 3b. The processing device 1 repeats transmission and reception of the policy until both the first user terminal 3a and the second user terminal 3b reach an agreement.

The policy that is agreed here may include a range of data to be used, a purpose of use, and the like in addition to the items shown in FIG. 3. For example, when the second processing data Db to be requested is a measured value of a sensor, the period during which the sensor had been used for taking measurements may be included. In this case, the processing device 1 extracts and processes data in a period set by the policy from the second processing data Db.

The managing unit 23 manages the first processing data Da and the second processing data Db according to the policy specified by the matching unit 22. The managing unit 23 controls each piece of processing data stored in the processing data storage unit 11 according to the policy data 12.

For example, the managing unit 23 performs access control such as disclosing the processing data to a disclosure destination user set by the policy data 12 and not disclosing the processing data to other users.

The managing unit 23 stops disclosure of the processing data which has passed the disclosure period set by the policy data 12.

In addition, when receiving a request to delete the second processing data Db from the second user terminal 3b, the managing unit 23 refers to the policy data 12 to confirm the presence or absence of an agreement policy related to the use of the second processing data Db or, more specifically, an agreement policy of which a use period remains. When there is no agreement policy, the managing unit 23 deletes the second processing data Db from the processing data storage unit 11. When there is an agreement policy related to the use of the second processing data Db or, more specifically, when a permission to use the second processing data Db for the first user terminal 3a is received from the second user terminal 3b and a use period remains, there may be a request to delete the second processing data Db from the second user terminal 3b. In such a case, the matching unit 22 notifies the first user terminal 3a of a request to delete the second processing data Db, and when a permission is received from the first user terminal 3a, the managing unit 23 deletes the second processing data Db. By deleting processing data after confirming the agreement policy, the managing unit 23 manages the processing data storage unit 11 so that users using the processing data are not inconvenienced. When conditions or the like for deleting processing data are predetermined in advance as the agreement policy, the managing unit 23 deletes the processing data according to such conditions.

In addition, the managing unit 23 may also record, for each piece of processing data stored in the processing data storage unit 11, the number of times of use, a period of use, and a date and time of use by another user as well as a name of the user having used the processing data. The record is used for billing a user having used processing data for the user thereof from the user terminal 3 having provided the processing data. Accordingly, utilization of processing data using the processing system 7 can be promoted. Furthermore, the number of times of use of processing data may be used as compensation for security management and audit by the processing device 1 for billing a user having provided the processing data.

When a permission is received from the second user terminal 3b, the processing unit 24 processes the first processing data Da and the second processing data Db, and outputs result data 13. The processing unit 24 performs processing using the volatile memory 14. After outputting the result data 13, the processing unit 24 deletes the data in the volatile memory 14. Once the processing is completed, the processing unit 24 deletes the data used for the processing.

Here, the volatile memory 14 and the processing unit 24 will be referred to as a protection area 10. When an agreement to share processing data is made between users in the protection area 10, a work area such as a container for performing processing based on the agreement is generated, and when processing based on the agreement is finished, the work area is erased. The protection area 10 is formed so as not to be connectable from an external terminal such as the user terminal 3 but to be connectable from the inside of the processing device 1. An individual work area such as a container is generated for each agreement between users, and since the work area is erased after processing, an outflow of processing data can be prevented.

In a case where the processing unit 24 performs processing according to a plurality of agreements, when program data is common among the respective agreements but reference data differs, the processing unit 24 may delete the program data from the volatile memory 14 after each step of processing is completed. Similarly, when reference data is shared among the respective agreements but program data differs, after each processing is completed, the reference data may be deleted from the volatile memory 14.

The processing unit 24 may further verify processing data using a verification script when processing the processing data. The processing unit 24 checks whether additional information of processing data that is reference data to be input to a program such as a data format, a structure, metadata, a unit of the processing data, and a creation time point are consistent and whether the processing data can be processed by program data. After the confirmation, the processing unit 24 writes the processing data to the volatile memory 14 and starts processing. Before the processing unit 24 processes the processing data such as when the user terminal 3 provides the processing data to the processing device 1 or when a processing agreement with another user is made, the data of the verification script is provided from the user terminal 3 to the processing device 1.

When the processing cannot be performed as a result of the verification by the processing unit 24, the user terminal 3 having provided the reference data is notified that the processing cannot be performed. When the processing can be performed, the processing unit 24 reads the reference data to the volatile memory 14, performs the processing, and outputs result data 13.

Even when the data is stored in an arbitrary format for each user, an output of an inaccurate processing result can be avoided by having the processing unit 24 verify the data in advance.

The providing unit 25 provides the result data 13 to the using user. When the result data 13 is generated, the providing unit 25 acquires an identifier of the using user by referring to the agreement policy data 12*a*, and transmits the result data 13 to the user terminal 3 of the using user. Alternatively, the providing unit 25 acquires the identifier of the using user by referring to the agreement policy data 12*a* when a request to acquire the result data 13 is made, and when the request source is the using user, the result data 13 may be transmitted to the user terminal 3 of the using user. The providing unit 25 may store the result data 13 in a storage area which is set by the agreement policy data 12*a* and accessible by the using user. In addition, an actuation such as kicking an external API may be generated with the provision of the result data to the first user terminal 3*a* as a trigger.

Processing in the processing system 7 will be described with reference to FIG. 4.

In step S11, the first user terminal 3*a* transmits the first processing data Da to the processing device 1. In step S12, the second user terminal 3*b* transmits the second processing data Db to the processing device 1. In step S13, the acquiring unit 21 of the processing device 1 stores the first processing data Da and the second processing data Db acquired in steps S11 and S12 in the processing data storage unit 11. When a disclosure policy of each piece of processing data is transmitted in steps S11 and S12, the acquiring unit 21 stores the disclosure policy in the policy data 12 and the managing unit 23 manages each piece of processing data according to the transmitted disclosure policy.

In step S14, the first user terminal 3*a* transmits a request for processing the second processing data Db together with the first processing data and for sharing the result data 13 of the processing by the first user terminal 3*a* to the processing device 1. At this time, the first user terminal 3*a* also transmits a policy associated with the use of the second processing data to the processing device 1. When receiving the request, the matching unit 22 of the processing device 1 transmits the request to the second user terminal 3*b*. The second user terminal 3*b* displays the contents of the received request and waits for an instruction from the user as to whether or not to permit the request. When a permission instruction is input, the second user terminal 3*b* returns the permission to the matching unit 22. The matching unit 22 sets a policy to the agreement policy data 12*a* in accordance with the permission of the second user terminal 3*b*.

When the user of the second user terminal 3*b* does not grant permission with respect to the policy presented by the first user terminal 3*a*, the second user terminal 3*b* transmits the changed contents of the policy input from the user to the matching unit 22 and the matching unit 22 transmits the changed contents of the policy to the first user terminal 3*a*. The first user terminal 3*a* displays the received changed contents of the policy and waits for an instruction of whether or not to permit the change from the user. When a permission instruction is input, the first user terminal 3*a* returns the permission to the matching unit 22. The matching unit 22 sets a policy to the agreement policy data 12*a* according to the permission by the first user terminal 3*a*. The transmission and reception of the policy between the first user terminal 3*a* and the second user terminal 3*b* may be repeated a plurality of times until both agree with each other.

When a policy is agreed upon between the first user terminal 3*a* and the second user terminal 3*b*, in step S18, the processing unit 24 writes the first processing data Da and the second processing data in the volatile memory 14. In step S19, the processing unit 24 processes the processing data of the volatile memory 14 to generate the result data 13. When the result data 13 is generated, in step S20, the processing unit 24 deletes the data of the volatile memory 14 read and written in the processing of step S19.

In step S21, the providing unit 25 provides the result data 13 to the first user terminal 3*a*.

According to the processing system 7, it is possible to share only the result of processing agreed upon between users without sharing program data and program reference data themselves desired to be concealed among a plurality of users. The processing system 7 can provide a program and reference data including advanced know-how as services. A user having reference data with high confidentiality can obtain a processing result by a program of another user to improve accuracy and realize complicated processing through the use of an external service.

The processing system 7 enables program data and reference data themselves to be safely used between users without disclosing the data to other users. High-precision analysis using programs provided by various users and utilization of data in a wider range are promoted. With respect to program data and reference data which have been previously kept only for use by users themselves, the processing system 7 can provide only a processing result to other users in a form that prevents the other users from duplicating the data, and users having provided the data can even obtain a charge corresponding to the use. Both the user who provides data and the user who utilizes the data can enjoy advantages of utilizing the data.

Further, in the embodiment of the present invention, while a case where the processing unit 24 processes data of one data set for each of reference data and program data has been described, the present invention is not limited thereto. The processing unit 24 may process data in which at least one of reference data and program data is made of a plurality of data sets. In addition, the data sets may be provided by three or more users and, and such a case, the matching unit 22 supports agreement of processing between the users providing the data sets.

(Modification)

In a modification, a case will be described in which the processing data storage unit 11 of the processing device 1 stores encrypted processing data and the processing unit 24 unlocks the encryption only inside the processing unit 24 and processes the processing data. The processing unit 24 used here is implemented by the method disclosed in NPL 3. Specifically, the processing unit 24 decrypts encrypted data only in a register inside a CPU that implements the processing unit 24 and processes the decrypted data.

In the modification, the control unit 31a of the first user terminal 3a encrypts first processing data Da with a public key which can be decrypted inside the CPU of the processing unit 24 of the processing device 1 and transmits the encrypted data to the processing device 1. The control unit 31a of the first user terminal 3a may further doubly encrypt, with a public key of the first user terminal 3a, the first processing data Da that has already been encrypted by a public key which can be decrypted in the CPU of the processing unit 24 of the processing device 1. Similarly, the control unit 31b of the second user terminal 3b encrypts second processing data Db with a public key which can be decrypted inside a CPU of the processing unit 24 of the processing device 1 and transmits the encrypted data to the processing device 1. The control unit 31b of the second user terminal 3b may further doubly encrypt, with a public key of the second user terminal 3b, the second processing data Db that has already been encrypted by a public key which can be decrypted in the CPU of the processing unit 24 of the processing device 1. The processing device 1 is configured to hold a secret key of the first user terminal 3a and a secret key of the second user terminal 3b before processing by the processing unit 24 such as when achieving an agreement on a policy or the like.

The acquiring unit 21 of the processing device 1 acquires first processing data Da and second processing data Db having been encrypted by a public key of each user terminal 3 and a public key which can be decrypted in the CPU of the processing unit 24. The acquiring unit 21 stores the encrypted first processing data Da and second processing data Db in the processing data storage unit 11. Since the processing data stored in the processing data storage unit 11 has been encrypted by the public key of each user terminal 3 and a public key which can be decrypted by the processing unit 24, it is difficult to decrypt the data even if the processing data is leaked.

When an agreement regarding processing is made between the first user terminal 3a and the second user terminal 3b, the processing unit 24 decrypts the encrypted first processing data Da using a secret key of the first user terminal 3a, decrypts the encrypted second processing data Db using a secret key of the second user terminal 3b, and stores the decrypted data in the volatile memory 14. Since the processing data stored in the volatile memory 14 has been encrypted by a public key which can be decrypted in the CPU of the processing unit 24, it is difficult to decrypt the data even if the processing data in the volatile memory 14 is leaked.

The processing unit 24 decrypts the encrypted first processing data Da and the encrypted second processing data Db in the CPU, processes the decrypted first processing data Da and the decrypted second processing data Db, and outputs result data 13. Since the decrypted first processing data Da and the decrypted second processing data Db exist only in a register of the CPU, leakage of data is less likely to occur. The first processing data Da and the second processing data Db decrypted in the modification are stored only in the volatile memory 14 accessible only by the processing unit 24 in the processing device 1. The result data 13 is provided to the first user terminal 3a. In addition, the processing unit 24 deletes the data of the volatile memory 14 used for the processing.

The processing by the processing system 7 according to the modification will be described with reference to FIG. 5.

In step S31, the first user terminal 3a doubly encrypts the first processing data Da with the public key of the first user terminal 3a and the public key of the processing unit 24 and transmits the doubly-encrypted data to the processing device 1. In step S32, the second user terminal 3b doubly encrypts the second processing data Db with the public key of the second user terminal 3b and the public key of the processing unit 24 and transmits the doubly-encrypted data to the processing device 1.

In step S33, the acquiring unit 21 of the processing device 1 stores the first processing data Da acquired in step S31 and the second processing data Db acquired in step S32 in the processing data storage unit 11. The first processing data Da and the second processing data Db stored in the processing data storage unit 11 are kept encrypted by the public key of each user terminal 3 and the public key which can be decrypted by the processing unit 24.

In step S34, the processing system 7 makes an agreement on a policy to have the result data 13 of processing be shared between the first user terminal 3a and the second user terminal 3b. Details are as described above in steps S14 to S17 in FIG. 4.

When a policy is agreed upon between the first user terminal 3a and the second user terminal 3b, in step S35, the processing unit 24 decrypts the encrypted processing data of the processing data storage unit 11 with the secret key of each user terminal 3. In step S36, the processing unit 24 writes the decrypted first processing data Da and the decrypted second processing data into the volatile memory 14. The processing data stored in the volatile memory 14 is encrypted by a public key which can be decrypted in the CPU of the processing unit 24.

In step S37, the processing unit 24 decrypts the processing data with a secret key of the processing unit 24 in the register of the CPU and processes the processing data to generate the result data 13. When the result data 13 is generated, in step S38, the processing unit 24 deletes the data in the volatile memory 14 having been read and written in the processing of step S37.

In step S39, the providing unit 25 provides the result data 13 to the first user terminal 3a.

In the modification, the processing data stored in the processing data storage unit 11 is encrypted by the public key of each user terminal 3 and the encryption key which can be decrypted by the processing unit 24, and the processing data stored in the volatile memory 14 is encrypted by the encryption key which can be decrypted by the processing unit 24. Safely of the data stored in the processing data storage unit 11 and the volatile memory 14 can be improved against data leakage due to external attack. Also, even if the data stored in the volatile memory 14 is encrypted, the CPU can process the data using a technique that enables the encrypted data to be decrypted only in a register of the CPU (NPL 3). Since the processing system 7 keeps processing data encrypted even for each user to be provided with a service and decrypts the processing data only inside the processing unit 24, the processing data can be safely distributed.

(Applications)

Three examples of application of the processing system 7 according to the embodiment and modification of the present invention will now be described.

First, an example used for cost prediction in the manufacturing industry will be described.

There is a company A having a design drawing of a certain product and a company B having a program for predicting costs from data of a design drawing. In order to learn how much production cost is generated by a newly created design drawing which is non-disclosed, the company A wants to obtain a cost prediction result by using the program of the company B.

On the other hand, the company B wants to provide a service such as collecting a usage fee of the program by informing a result of using the program to another company such as the company A and desires to expand business. However, since the cost prediction program of the company A is information which cannot be disclosed to other companies as know-how of the company, the company B does not have the means for safely distributing confidential data and algorithms with the company A.

Meanwhile, the processing system 7 provided by a neutral third party having no interest relation to the manufacturing industry or to the company A or the company B provides a base for sharing a processing result using program data and reference data inputted to a program between companies. The company B develops and provides a cost prediction service using a proprietary cost prediction program, by using the processing system 7. When the company A uses the cost prediction service provided by the company B, the processing device 1 receives and processes the encrypted design drawing data of the company A and the encrypted cost prediction program of the company B on the basis of an agreement between the company A and the company B. The processing device 1 sends only the processing result to the company A, and the company A can comprehend a prediction of production cost without disclosing the design drawing. Also, the processing device 1 shares information such as the number of times of processing using the program with the company B so that the company B can collect a usage fee of the program from the company A without disclosing the program.

Specifically, the second user terminal 3b of the company B encrypts second processing data Db which is a cost prediction program and transmits the encrypted second processing data Db to the processing device 1. The first user terminal 3a of the company A using the cost prediction service provided by the company B encrypts first processing data Da being design drawing data and transmits the encrypted data to the processing device 1. The processing device 1 stores the cost prediction program and the design drawing data in the processing data storage unit 11. The company A transmits a processing request of the cost prediction program with respect to the company B and a policy related to the design drawing data to the processing device 1 in order to obtain a processing result of applying the cost prediction program to the design drawing data. The matching unit 22 of the processing device 1 displays a use permission condition of the cost prediction program based on the processing request sent from the company A on the second user terminal 3b of the company B. When permission by the company B is obtained, the matching unit 22 registers a policy representing the permitted use condition in the policy data 12.

The processing unit 24 sends the permitted cost prediction program and the design drawing data from the processing data storage unit 11 to the protection area 10, decrypts the cost prediction program and the design drawing data in the protection area 10, and obtains the result data 13 of processing using the cost prediction program and the design drawing data. The processing device 1 transmits the result data 13 to the company A through the providing unit 25. Alternatively, the processing device 1 may store the result data 13 in a database (not shown) that the company A can refer to. The cost prediction program and the design diagram data having been decrypted in the protection area 10 are deleted. Using the processing result, the company A can perform cost prediction with higher accuracy than an analysis performed in-house and make improvements in production plans and design drawings. The company B collects a usage fee from the company A according to the number of times of use of the cost prediction program, and by providing the cost prediction program free of charge to customers using other services of the company B, customer satisfaction can be improved and customer acquisition and retention can be achieved. Next, an example of use for calculating an insurance grade with a medical institution will be described.

There is a medical institution A which is a hospital, a company B which is an insurance company, and a patient at the medical institution A. The medical institution A has a health diagnosis result of a certain patient as non-disclosed information. The company B has a program for calculating an insurance grade on the basis of information of a patient who has contracted an insurance product of the company and the health diagnosis result. The patient is trying to sign an agreement for an insurance policy provided by the company B.

When the patient makes a change to or applies for an insurance contract, the company B considers calculating an insurance grade corresponding to the latest health diagnostic result of the patient having signed a contract for an insurance product of the company but is unable to directly receive the health diagnostic result of the patient for personal information protection.

The company B informs the patient who has received the health diagnosis that an estimate for an insurance product can be presented to the patient or an application for an insurance product can be made by the patient if the patient can provide the health diagnosis result data. The processing device 1 obtains an agreement from the three parties, namely, the medical institution A, the company B, and the patient with respect to providing data of the health diagnosis result of the patient in order for the patient to make an application for an insurance policy, estimate an insurance fee, and the like. The processing device 1 receives the encrypted health diagnosis result data of the patient being held by the medical institution A and an encrypted insurance grade calculation program of the company B, and sends only the processing result to the company B. Thus, the patient can calculate the insurance grade and the like by the company B without disclosing the health diagnostic result to the company B, and can change the contract of an insurance product or make a new application. The company B can obtain accurate information on an insurance grade of the patient without disclosing the insurance grade calculation program.

Specifically, the patient sets a disclosure condition of his/her own health diagnostic data or agrees with the use of his/her own health diagnostic data by the insurance grade calculation program of the company B. The first user terminal 3a owned by the patient or the medical institution A having obtained permission of the patient encrypts the first processing data Da being the health diagnostic data of the patient and transmits the encrypted data to the processing device 1. The second user terminal 3b owned by the company B encrypts the second processing data Db being the insurance grade calculation program and transmits the encrypted data to the processing device 1. The processing device 1 stores the insurance grade calculation program and the health diagnostic data in the processing data storage unit 11. In this case, in order to further enhance the security against leakage of the medical information of the patient, a CPU and a memory having a function capable of being decrypted only in a register of the CPU may be used in the protection area 10. The patient transmits a processing request using the insurance grade calculation program to the company B and a policy related to the patient's own health diagnostic data to the processing device 1 in order to obtain a processing result of applying the insurance grade calculation program to the patient's own health diagnostic data. The matching unit 22 of the processing device 1 displays a use permission condition of the insurance grade calculation program based on the processing request having been sent from the company A on the second user terminal 3b of the company B. When a permission by the company B is obtained, the matching unit 22 registers a policy corresponding to the permitted use condition in the policy data 12. When processing using the insurance grade calculation program is to be automatically permitted if the patient agrees, a policy of automatically permitting a processing request from the patient may be set.

The processing unit 24 acquires the permitted insurance grade calculation program and the health diagnostic data from the processing data storage unit 11, decrypts the insurance grade calculation program and the health diagnostic data in the protection area 10, and obtains the result data 13 of the result of processing using the insurance grade calculation program and the health diagnostic data. The processing device 1 transmits the result data 13 to the patient through the providing unit 25. Alternatively, the processing device 1 may store the result data 13 in a database (not shown) that can be referred to by the patient. The insurance grade calculation program and the health diagnostic data having been decrypted in the protected area 10 are deleted. The patient can comprehend an insurance grade by referring to the processing result and confirm a product applicable to himself/herself among the insurance products of the company B. The company B can introduce insurance products of the company to the patient who may become a customer by providing the insurance grade calculation program and can simplify the selection and application procedure of the insurance products.

Finally, an example of use for purchase prediction in the retail industry will be described.

There is a retail company A who develops supermarkets throughout the country and a company B who is a manufacturer. The company A has sales information of a chain of supermarkets throughout the country as non-disclosed data. The company B has a highly-accurate purchase amount prediction program for each area. In order to improve purchase prediction accuracy of a store in a certain area, the company A is contemplating the use of the purchase amount prediction program of the company B. The company B desires to obtain a profit by providing the company A with a prediction result using a non-disclosed program. However, since both the sales information of the company A and the prediction program of the company B are non-disclosed, there has been no method for realizing the desires of the company A and the company B.

Based on an agreement made between the company A and the company B, the processing device 1 receives encrypted sales data of the company A and an encrypted purchase amount prediction program of the company B and processes the sales data using the program. The processing device 1 sends only a processing result to the company A, and the company A can obtain a highly accurate purchase amount prediction result for each area having been processed by the algorithm of the company B without disclosing the sales data. The processing device 1 shares information such as the number of times of processing using the program to the company B so that the company B can collect a usage fee from the company A without disclosing the program.

Specifically, the second user terminal 3b of the company B encrypts and transmits second processing data Db being a purchase amount prediction program to the processing device 1. The first user terminal 3a of the company A using the highly-accurate purchase amount prediction service provided by the company B encrypts first processing data Da being sales data and transmits the encrypted data to the processing device 1. The processing device 1 stores the purchase amount prediction program and the sales data in the processing data storage unit 11. The company A transmits a processing request of the purchase amount prediction program with respect to the company B and a policy related to the sales data to the processing device 1 in order to obtain a processing result of applying the purchase amount prediction program to its own sales data. The matching unit 22 of the processing device 1 displays a use permission condition of the purchase amount prediction program based on the processing request having been sent from the company A on the second user terminal 3b of the company B. When permission by the company B is obtained, the matching unit 22 registers a policy representing the permitted use condition in the policy data 12.

The processing unit 24 sends the permitted purchase amount prediction program and the sales data from the processing data storage unit 11 to the protection area 10, decrypts the purchase amount prediction program and the sales data in the protection area 10, and obtains the result data 13 of processing using the purchase amount prediction program and the sales data. The processing device 1 transmits the result data 13 to the company A through the providing unit 25. Alternatively, the processing device 1 may store the result data 13 in a database (not shown) that the company A can refer to. The purchase amount prediction program and the sales data having been decrypted in the protection area 10 are deleted. Using the received processing result, the company A can predict a purchase amount with higher accuracy than a prediction according to the company's own analysis method. By collecting a program usage fee from the company A according to the number of times of use of the purchase amount prediction program or the like or permitting the use of the purchase amount prediction program as a privilege accompanying the use of the company's other services, the company B can create a profit for the company A as a customer or enhance customer satisfaction.

As the processing device 1 and the user terminal 3 of the present embodiment described above, a general-purpose computer system is used which includes a CPU (Central Processing Unit, processor) 901, a memory 902, a storage 903 (HDD: Hard Disk Drive, SSD: Solid State Drive), a communication device 904, an input device 905, and an output device 906. In this computer system, the respective functions of the processing device 1 and the user terminal 3 are realized when the CPU 901 executes a predetermined program loaded to the memory 902.

Note that the processing device 1 and the user terminal 3 may be respectively implemented by one computer or may be respectively implemented by a plurality of computers. In addition, the processing device 1 and the user terminal 3 may respectively be a virtual machine implemented in a computer.

The respective programs for the processing device 1 and the user terminal 3 can be stored in a computer-readable recording medium such as an HDD, an SSD, a USB (Universal Serial Bus) memory, a CD (Compact Disc), and a DVD (Digital Versatile Disc) or distributed over a network.

The present invention is not limited to the above embodiment and numerous modifications can be made within the scope and gist of the invention.

REFERENCE SIGNS LIST

1 Processing device
3 User terminal
5 Communication network
7 Processing system
10 Protection area
11 Processing data storage unit
12 Policy data
13 Result data
14 Volatile memory
21 Acquiring unit
22 Matching unit
23 Managing unit
24 Processing unit
25 Providing unit
31 Control unit
901 CPU
902 Memory
903 Storage
904 Communication device
905 Input device
906 Output device
Da First processing data
Db Second processing data

The invention claimed is:

1. A processing device, comprising:
an acquiring unit, including one or more processors, configured to acquire first processing data from a first user terminal and to acquire second processing data from a second user terminal;
a matching unit, including one or more processors, configured to receive a request for sharing result data of processing by the first processing data and the second processing data from the first user terminal and to receive permission of use of the second processing data by the first user terminal from the second user terminal;
a processing unit, including one or more processors, configured to verify the first processing data using a verification script and process the first processing data and the second processing data and to output the result data when receiving permission from the second user terminal; and
a providing unit, including one or more processors, configured to provide the result data to the first user terminal.

2. The processing device according to claim 1, wherein the processing data is data referred to in computer processing or program data for executing computer processing.

3. The processing device according to claim 1, wherein the acquiring unit is configured to acquire first processing data and second processing data having been encrypted by an encryption key that can be decrypted in a CPU of the processing unit, and
the processing unit is configured to decrypt the encrypted first processing data and second processing data in the CPU, process the decrypted first processing data and second processing data, and output the result data.

4. The processing device according to claim 1, wherein the acquiring unit is configured to acquire first processing data and second processing data having been encrypted with an encryption key that can be decrypted by the processing device, and
the processing unit is configured to decrypt the encrypted first processing data and second processing data, store the decrypted first processing data and second processing data in a volatile memory accessible by the processing unit, process the decrypted first processing data and second processing data, and output the result data.

5. The processing device according to claim 4, wherein the processing unit is configured to delete data in the volatile memory after outputting the result data.

6. The processing device according to claim 1, wherein the matching unit is configured to, when receiving a sharing request and a policy, notify the second user terminal of the policy and specify a policy having been permitted by the first user terminal and the second user terminal, and
the processing device further comprises a managing unit, including one or more processors, configured to manage the first processing data and the second processing data according to the specified policy.

7. A processing method comprising:
a computer acquiring first processing data from a first user terminal and acquiring second processing data from a second user terminal;
the computer receiving a request for sharing result data of processing by the first processing data and the second processing data from the first user terminal and receiving permission of use of the second processing data by the first user terminal from the second user terminal;
the computer verifying, when receiving permission from the second user terminal, the first processing data using a verification script and processing the first processing data and the second processing data and outputting the result data; and
the computer providing the result data to the first user terminal.

8. A non-transitory tangible medium storing a program, where executing of the program causes one or more computers to perform operations comprising:
acquiring first processing data from a first user terminal and acquiring second processing data from a second user terminal;
receiving a request for sharing result data of processing by the first processing data and the second processing data from the first user terminal and receiving permission of use of the second processing data by the first user terminal from the second user terminal;
verifying, when receiving permission from the second user terminal, the first processing data using a verification script and processing the first processing data and the second processing data and outputting the result data; and
providing the result data to the first user terminal.

9. The processing device according to claim 1, wherein to verify the first processing data using the verification script, the processing unit is configured to check one or more of a data format, a structure, metadata, a unit, and a creation time point of the first processing data.

10. The processing device according to claim 1, wherein the matching unit is configured to receive an agreement to share the result data with a third user terminal from the first user terminal and the second user terminal and the providing unit is configured to provide the result data to the third user terminal.

11. The processing device according to claim 1, wherein the first processing data is doubly encrypted with a public key of the first user terminal and a public key of a processing unit, the second processing data is doubly encrypted with a public key of the second user terminal and the public key of the processing unit, and the processing unit is configured to decrypt the first processing data with a secret key of the first user terminal, decrypt the second processing data with a secret key of the second user terminal, decrypt the first and second processing data with the secret key of the processing unit in a CPU of the processing unit, and process the first processing data and the second processing data.

* * * * *